US010779354B2

(12) United States Patent
Nagasaka et al.

(10) Patent No.: US 10,779,354 B2
(45) Date of Patent: Sep. 15, 2020

(54) COMMUNICATION METHOD, RADIO TERMINAL, AND PROCESSOR

(71) Applicant: KYOCERA CORPORATION, Kyoto (JP)

(72) Inventors: Yushi Nagasaka, Ritto (JP); Masato Fujishiro, Yokohama (JP); Kugo Morita, Higashiomi (JP); Hiroyuki Adachi, Kawasaki (JP); Fangwei Tong, Machida (JP); Shingo Katagiri, Yokohama (JP); Chiharu Yamazaki, Tokyo (JP); Hiroyuki Urabayashi, Yokohama (JP); Naohisa Matsumoto, Higashiomi (JP); Katsuhiro Mitsui, Ritto (JP)

(73) Assignee: KYOCERA Corporation, Kyoto (JP)

( * ) Notice: Subject to any disclaimer, the term of this patent is extended or adjusted under 35 U.S.C. 154(b) by 27 days.

(21) Appl. No.: 15/693,675

(22) Filed: Sep. 1, 2017

(65) Prior Publication Data
US 2018/0014347 A1 Jan. 11, 2018

Related U.S. Application Data

(63) Continuation of application No. PCT/JP2016/056441, filed on Mar. 2, 2016.
(Continued)

(30) Foreign Application Priority Data

Mar. 3, 2015 (JP) .................................. 2015-041867

(51) Int. Cl.
H04W 76/28 (2018.01)
H04W 8/22 (2009.01)
(Continued)

(52) U.S. Cl.
CPC ............. *H04W 76/28* (2018.02); *H04W 8/22* (2013.01); *H04W 52/0212* (2013.01);
(Continued)

(58) Field of Classification Search
CPC ..... H04W 76/28; H04W 76/27; H04W 88/02; H04W 76/20; H04W 76/10; H04W 76/25;
(Continued)

(56) References Cited

U.S. PATENT DOCUMENTS 9,363,799 B2     6/2016  Park et al.
9,794,876 B2 *  10/2017  Choi .................... H04W 76/28
(Continued)

FOREIGN PATENT DOCUMENTS

EP      2 908 576 A1    8/2015
JP      2010-056740 A   3/2010
(Continued)

OTHER PUBLICATIONS

Ericsson, "Idle Mode DRX Assignment", Jan. 26-30, 2015, 3GPP (Year: 2015).*
(Continued)

*Primary Examiner* — Jae Y Lee
*Assistant Examiner* — Aixa A Guadalupe Cruz
(74) *Attorney, Agent, or Firm* — Studebaker & Brackett PC

(57) ABSTRACT

A communication method according to an embodiment comprises: notifying, by a base station, a radio terminal of a discontinuous reception (DRX) cycle; notifying, by a Mobility Management Entity (MME), the radio terminal of an extended DRX cycle longer than the DRX cycle; determining, by the radio terminal, whether or not the base station supports an extend DRX; using, by the radio terminal, the extended DRX cycle to execute an extended DRX operation in an idle mode, in response to determining that the base
(Continued)

station supports the extend DRX; and using, by the radio terminal, the DRX cycle to execute a DRX operation without using the extended DRX cycle, in response to determining that the base station does not support the extend DRX.

5 Claims, 9 Drawing Sheets

Related U.S. Application Data

(60) Provisional application No. 62/165,315, filed on May 22, 2015.

(51) Int. Cl.
  *H04W 52/02* (2009.01)
  *H04W 88/08* (2009.01)
  *H04W 24/02* (2009.01)

(52) U.S. Cl.
  CPC ... *H04W 52/0216* (2013.01); *H04W 52/0225* (2013.01); *H04W 24/02* (2013.01); *H04W 52/0209* (2013.01); *H04W 52/0251* (2013.01); *H04W 88/08* (2013.01); *Y02D 70/20* (2018.01)

(58) Field of Classification Search
  CPC . H04W 76/00; H04W 52/02; H04W 52/0216; H04W 24/02; H04L 5/0096
  See application file for complete search history.

(56) References Cited

U.S. PATENT DOCUMENTS

| | | | |
|---|---|---|---|
| 9,826,526 B2 | 11/2017 | Oizumi et al. | |
| 9,974,058 B2 | 5/2018 | Maattanen et al. | |
| 10,244,449 B2 | 3/2019 | Fujishiro et al. | |
| 10,420,164 B2 * | 9/2019 | Uchino | H04W 52/0216 |
| 2007/0015530 A1 | 1/2007 | Ding | |
| 2012/0082051 A1 | 4/2012 | Kim et al. | |
| 2012/0314680 A1 | 12/2012 | Kela | |
| 2014/0119258 A1 | 5/2014 | Takano | |
| 2014/0329529 A1 | 11/2014 | Jung et al. | |
| 2016/0174189 A1 | 6/2016 | Yoshizawa | |
| 2016/0242176 A1 | 8/2016 | Sun et al. | |
| 2017/0164419 A1 | 6/2017 | Kim | |

FOREIGN PATENT DOCUMENTS

| | | |
|---|---|---|
| JP | 2013-055394 A | 3/2013 |
| WO | 2012/137294 A1 | 10/2012 |
| WO | 2014/158268 A1 | 10/2014 |
| WO | 2015/019727 A1 | 2/2015 |

OTHER PUBLICATIONS

An Office Action issued by the European Patent Office dated Feb. 12, 2018, which corresponds to European Patent Application No. 16 758 967.0-1219 and is related to U.S. Appl. No. 15/693,675.

An Office Action issued by the Japanese Patent Office dated Oct. 3, 2017, which corresponds to Japanese Patent Application No. 2017-503691 and is related to U.S. Appl. No. 15/693,675; with English Concise Explanation.

3rd Generation Partnership Project; Technical Specification Group Services and System Aspects; Study on System Impacts of Extended DRX Cycle for Power Consumption Optimization; 3GPP TSG-SA WG2#107 S2-150603; Jan. 30, 2015; pp. 2-15; Release 13; 3GPP Organizational Partners.

An Office Action; "Notice of Reasons for Rejection" issued by the Japanese Patent Office dated Feb. 13, 2018, which corresponds to Japanese Patent Application No. 2017-503691 and is related to U.S. Appl. No. 15/693,675; with English language Concise Explanation.

Ericsson, ST-Ericsson; Extending DRX cycles beyond the current SFN range; 3GPP TSG-RAN WG2 #83; Aug. 19-23, 2013; p. 1-8; R2-132806; Barcelona, Spain.

International Search Report issued in PCT/JP2016/056441; dated May 24, 2016.

Qualcomm Incorporated; New WI Proposal: RAN enhancements for extended DRX in LTE; 3GPP TSG RAN Meeting #66; RP-141994; Dec. 8-11, 2014; pp. 1-6; Maui, USA.

Ericsson; Idle mode DRX assignment; SA WG2 Meeting #107; S2-150606; Jan. 26-30, 2015; pp. 1-3; Sorrento, Italy.

Qualcomm Incorporated; Solutions for FS_eDRX in Idle mode: SA WG2 Meeting #107; S2-150202; Jan. 26-30, 2015; pp. 1-4; Sorrento, Italy.

3rd Generation Partnership Project; Technical Specification Group Services and System Aspects; Study on Machine-Type Communications (MTC) and other mobile data applications communications enhancements; 3GPP TR 23.887 V12.0.0; Dec. 2013; pp. 1-8; Release 12; 3GPP Organizational Partners.

3rd Generation Partnership Project; Technical Specification Group Services and System Aspects; Study on System Impacts of Extended DRX Cycle for Power Consumption Optimization; 3GPP TR 23.770 V0.1.0; Feb. 2015; pp. 1-4; Release 13; 3GPP Organizational Partners.

NTT Docomo, Inc., "Discussion on issues related to UL transmission in LAA," 3GPP TSG RAN WG1 Meeting #80bis, Apr. 20-24, 2015, p. 1-6, R1-151958, Belgrade, Serbia.

ETRI, "Discussion on ul grant for LAA," 3GPP TSG RAN WG1 Meeting #80bis, Apr. 20-24, 2015, p. 1-6, R1-152095, Belgrade, Serbia.

Kyocera, "Discontinuous Transmission Design for LAA," 3GPP TSG RAN WG1 Meeting #81, May 25-29, 2015, p. 1-4, R1-153102, Fukuoka, Japan.

Intel Corporation, "Uplink transmission with LBT," 3GPP TSG-RAN WG2 #89bis, Apr. 20-24, 2015, p. 1-6, R2-151102, Bratislava, Slovakia.

* cited by examiner

FIG.7A

```
PCCH-Config ::=                    SEQUENCE {
    defaultPagingCycle                 ENUMERATED {
                                           rf32, rf64, rf128, rf256, rf512, rf1024, ... ,
rf8192, ...},
    nB                                 ENUMERATED {
                                           fourT, twoT, oneT, halfT, quarterT, oneEighthT,
                                           oneSixteenthT, oneThirtySecondT}
}
```

FIG.7B

```
Idle-eDRX-Config ::=                   SEQUENCE {
    extendedDRXCycle                   ENUMERATED {
                                           rf8, rf16, ..., rf512, rf1024, ... , rf8192, ...}
}
```

FIG.7C

```
ePCCH-Config ::=                   SEQUENCE {
    pagingCycleFactor                  ENUMERATED {
                                           one, threeHalf, two, fiveHalf, three, ...}
}
```

COMMUNICATION METHOD, RADIO TERMINAL, AND PROCESSOR

RELATED APPLICATIONS

This application is a continuation application of international application PCT/JP2016/056441, filed Mar. 2, 2016, which claims benefit of JP Patent Application No. 2015-041867, filed Mar. 3, 2015, and U.S. Provisional Application No. 62/165,315, filed on May 22, 2015, the entirety of all applications hereby expressly incorporated by reference.

TECHNICAL FIELD

The present application relates to a communication method, a radio terminal, and a processor.

BACKGROUND ART

In 3GPP (3rd Generation Partnership Project), which is a project aiming to standardize a mobile communication system, a discontinuous reception (DRX) is prescribed as an intermittent reception technique to reduce power consumption of a radio terminal. The radio terminal executing a DRX operation intermittently monitors a downlink control channel. A cycle in which the downlink control channel is monitored is referred to as "DRX cycle".

In recent years, machine-type communication (MTC) in which a radio terminal performs communication without human intervention in a mobile communication system has attracted attention. From such a background, an ongoing discussion is a new introduction of an extended DRX cycle longer than a conventional DRX cycle to further reduce power consumption (for example, see Non Patent Document 1). The DRX using the extended DRX cycle is referred to as "extended DRX".

PRIOR ART DOCUMENT

Non-Patent Document

Non Patent Document 1: 3GPP contribution "RP-141994"

SUMMARY

A communication method according to an embodiment comprises: notifying, by a base station, a radio terminal of a discontinuous reception (DRX) cycle; notifying, by a Mobility Management Entity (MME), the radio terminal of an extended DRX cycle longer than the DRX cycle; determining, by the radio terminal, whether or not the base station supports an extend DRX; using, by the radio terminal, the extended DRX cycle to execute an extended DRX operation in an idle mode, in response to determining that the base station supports the extend DRX; and using, by the radio terminal, the DRX cycle to execute a DRX operation in the idle mode without using the extended DRX cycle, in response to determining that the base station does not support the extend DRX.

A radio terminal according to an embodiment comprises a controller including a processor and a memory communicatively coupled to the processor. The controller is configured to: receive a discontinuous reception (DRX) cycle from a base station; receive an extended DRX cycle longer than the DRX cycle from a Mobility Management Entity (MME); determine whether or not the base station supports an extend DRX; use the extended DRX cycle to execute an extended DRX operation in an idle mode, in response to determining that the base station supports the extend DRX; and use the DRX cycle to execute a DRX operation in the idle mode without using the extended DRX cycle, in response to determining that the base station does not support the extend DRX.

A processor according to an embodiment is a processor for controlling a radio terminal. The processor comprises a memory communicatively coupled to the processor and including instructions, such that when executed by the processor executes the processes of: receiving a discontinuous reception (DRX) cycle from a base station; receiving an extended DRX cycle longer than the DRX cycle from a Mobility Management Entity (MME); determining whether or not the base station supports an extend DRX; using the extended DRX cycle to execute an extended DRX operation in an idle mode, in response to determining that the base station supports the extend DRX; and using the DRX cycle to execute a DRX operation in the idle mode without using the extended DRX cycle, in response to determining that the base station does not support the extend DRX.

BRIEF DESCRIPTION OF THE DRAWINGS

FIGS. 7A to 7C are diagrams for describing a configuration of an extended DRX according to an embodiment.

DESCRIPTION OF THE EMBODIMENT

Overview of Embodiment

Figure 1:
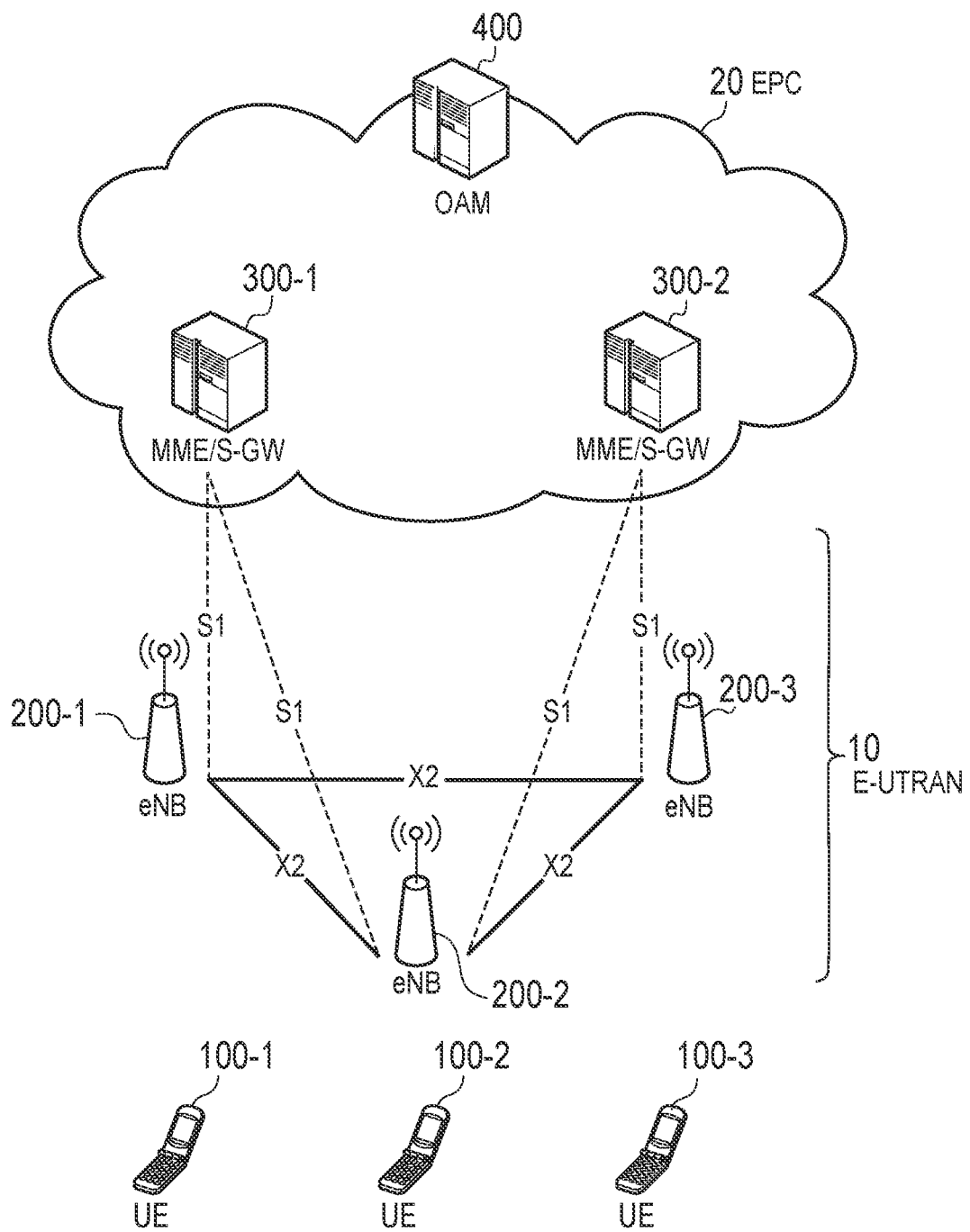
FIG. 1 is a configuration diagram of an LTE system.

In spite of the forgoing, in the current specification, only a mechanism for controlling a DRX is prescribed, and there is no mechanism for appropriately controlling an extended DRX.

A radio terminal according to an embodiment comprises: a controller configured to execute a process of notifying a network of a parameter relevant to an extended DRX in order to request a configuration of the extended DRX. The parameter relevant to the extended DRX is used by a radio terminal configured with the extended DRX to specify timing for receiving a paging transmitted from a base station.

A network apparatus according to an embodiment comprises: a controller configured to execute a process of receiving a parameter relevant to an extended DRX, the parameter being transmitted by a radio terminal for requesting a configuration of the extended DRX. The parameter relevant to the extended DRX is used by the radio terminal configured with the extended DRX to specify timing for receiving a paging transmitted from a base station. The controller determines, upon receiving from the radio terminal the parameter relevant to the extended DRX, whether or not it is possible to configure the extended DRX in the radio terminal, and if determining that it is possible to configure the extended DRX, executes a process of notifying the radio terminal of the parameter relevant to the extended DRX.

A network apparatus according to an embodiment is used in a communication system having a radio terminal notified of a first DRX cycle in an idle mode. The first DRX cycle is notified, by first DRX configuration information, to the radio terminal. The network apparatus comprises a controller configured to notify, by broadcast or unicast, the radio terminal of a second DRX cycle longer than the first DRX cycle by second DRX configuration information different from the first DRX configuration information.

The network apparatus may further comprise: a receiver configured to receive from the radio terminal a notification with an indication that the second DRX cycle is configured, if notifying the second DRX cycle by broadcast.

The network apparatus may further comprise: a receiver configured to receive from the radio terminal request information on a second DRX cycle desired by the radio terminal.

The controller may notify, by unicast, the radio terminal of the second DRX cycle determined on the basis of the request information.

The controller may notify the radio terminal of the second DRX cycle by unicast without notifying the second DRX cycle by broadcast.

The network apparatus may be a base station. The controller may notify, by unicast, the radio terminal of the second DRX cycle upon releasing an RRC connection with the radio terminal.

The network apparatus may be an upper node of a base station. The controller may notify the base station of the second DRX cycle notified by unicast to the radio terminal and an identifier of the radio terminal.

The controller notifies the radio terminal of a plurality of values indicating the second DRX cycle. Any one of the plurality of values may be selected, as the second DRX cycle, by the radio terminal.

The network apparatus may be a base station. The network apparatus may further comprises a receiver configured to receive from an upper node of the base station a list including an identifier of a radio terminal configured with the second DRX cycle. The receiver may receive a paging from the upper node. If a destination of the paging is included in the list, the controller may notify, based on the second DRX cycle, the radio terminal of a paging message addressed to the radio terminal.

The network apparatus may be a base station. The network apparatus may further comprises a receiver configured to receive a paging from an upper node of the base station. If receiving information indicating that a destination of the paging is a radio terminal configured with the second DRX cycle, the controller may notify, based on the second DRX cycle, the radio terminal of a paging message addressed to the radio terminal.

The controller may notify the radio terminal of the second DRX cycle longer than an implicit detach timer. The implicit detach timer may be a timer for a network to detach the radio terminal if expiring before the radio terminal contacts the network. The controller may execute an operation for stopping the implicit detach timer.

The controller may notify a base station being a lower node of the network apparatus of the second DRX cycle notified by unicast to the radio terminal, time information on start timing of the second DRX cycle, and an identifier of the radio terminal.

The controller may notify a base station being a lower node of the network apparatus, of a timer value indicating a period, as the second DRX cycle, for omitting monitoring for receiving a paging message.

A radio terminal according to an embodiment receives, by first DRX configuration information, a first DRX cycle in an idle mode. The radio terminal comprises: a receiver configured to receive from a network apparatus a second DRX cycle longer than the first DRX cycle, by second DRX configuration information different from the first DRX configuration information; and a controller configured to execute, in the idle mode, a DRX operation using the second DRX cycle.

The controller may notify, after the second DRX cycle has been configured, the network apparatus of the second DRX cycle being configured.

The controller may notify the network apparatus of request information on a second DRX cycle desired by the radio terminal.

The controller may determine the desired second DRX cycle, in accordance with a performance of a crystal oscillator provided in the radio terminal and configured to measure a time period.

If the second DRX cycle is longer than a predetermined period, during execution of the DRX operation, the controller may receive a system frame number from a cell in which the radio terminal exists, before an elapse of the predetermined period.

The predetermined period may be a value according to a performance of a crystal oscillator provided in the radio terminal and configured to measure a time period.

A radio terminal according to an embodiment receives a DRX cycle in an idle mode and an nB parameter indicating the number of paging opportunities in a paging cycle. The radio terminal comprises: a receiver configured to receive a coefficient parameter for real-number multiplying the DRX cycle; and a controller configured to determine the paging frame, based on an extended DRX cycle calculated by the DRX cycle and the coefficient parameter, and the nB parameter. The controller corrects the extended DRX cycle, if a condition established according to the extended DRX cycle and the nB parameter is not satisfied.

The condition may be that a value obtained by multiplying the extended DRX cycle and the nB parameter is an integral number.

The controller may correct the extended DRX cycle, based on a value in accordance with a denominator of the nB parameter.

A base station according to an embodiment is used in a communication system having a radio terminal configured to receive a DRX cycle in an idle mode. The base station comprises: a transmitter configured to transmit to the radio terminal a coefficient parameter for real-number multiplying the DRX cycle; and a controller configured to determine a paging frame for notifying a paging message, based on an extended DRX cycle calculated by the DRX cycle and the coefficient parameter. The controller corrects the extended DRX cycle, if not possible to determine the paging frame on the basis of the extended DRX cycle.

A radio terminal according to an embodiment executes a DRX operation in an idle mode by using a shorter cycle, out of a first DRX cycle notified by broadcast from a base station and a second DRX cycle notified by unicast from an upper node of the base station. The radio terminal comprises: a controller configured to preferentially use the second DRX cycle if the second DRX cycle is notified by extended DRX configuration information by which an extended DRX cycle longer than the first DRX cycle can be configured.

The controller may use the first DRX cycle, if the base station cannot notify, based on the second DRX cycle, the radio terminal of a paging message.

The controller may determine that, if receiving from the base station the extended DRX configuration information, the base station can notify, based on the second DRX cycle, the radio terminal of the paging message.

A network apparatus according to an embodiment is used in a communication system having a radio terminal notified of a first DRX cycle in an idle mode. The network apparatus comprises: a controller configured to notify a base station being a lower node of the network apparatus, of information indicating whether or not a second DRX cycle longer than the first DRX cycle is applied to the radio terminal, or information indicating whether or not the second DRX cycle is applicable to the radio terminal.

Embodiment

Hereinafter, an embodiment will be described with an example as a LTE system.

(System Configuration)

FIG. 1 is a configuration diagram of the LTE system. As illustrated in FIG. 1, the LTE system according to the first embodiment comprises UEs (User Equipments) 100, E-UTRAN (Evolved Universal Terrestrial Radio Access Network) 10, and EPC (Evolved Packet Core) 20.

The UE 100 corresponds to the radio terminal. The UE 100 is a mobile communication apparatus and performs radio communication with a cell (a serving cell) for a connection destination. Configuration of UE 100 will be described later.

The E-UTRAN 10 corresponds to a radio access network. The E-UTRAN 10 includes a plurality of eNBs 200 (evolved Node-Bs). The eNB 200 corresponds to a base station. The eNBs 200 are connected mutually via an X2 interface. Configuration of eNB 200 will be described later.

The eNB 200 manages one cell or a plurality of cells and performs radio communication with the UE 100 that establishes a connection with the cell. The eNB 200 has a radio resource management (RRM) function, a routing function of user data, and a measurement control function for mobility control and scheduling and the like. The "cell" is used as a term indicating a minimum unit of a radio communication area, and is also used as a term indicating a function of performing radio communication with the UE 100.

The EPC 20 corresponds to a core network. The E-UTRAN 10 and the EPC 20 constitute a network of the LTE system (LTE network). The EPC 20 includes MMEs (Mobility Management Entities)/S-GWs (Serving-Gateways) 300 and an OAM (Operation and Maintenance) 400. The MME performs various mobility controls and the like, for the UE 100. The S-GW performs transfer control of user data. The eNB 200 is connected to the MME/S-GW 300 via an S1 interface.

The OAM 400 is a server device managed by an operator and performs maintenance and monitoring of the E-UTRAN 10.

Figure 2:
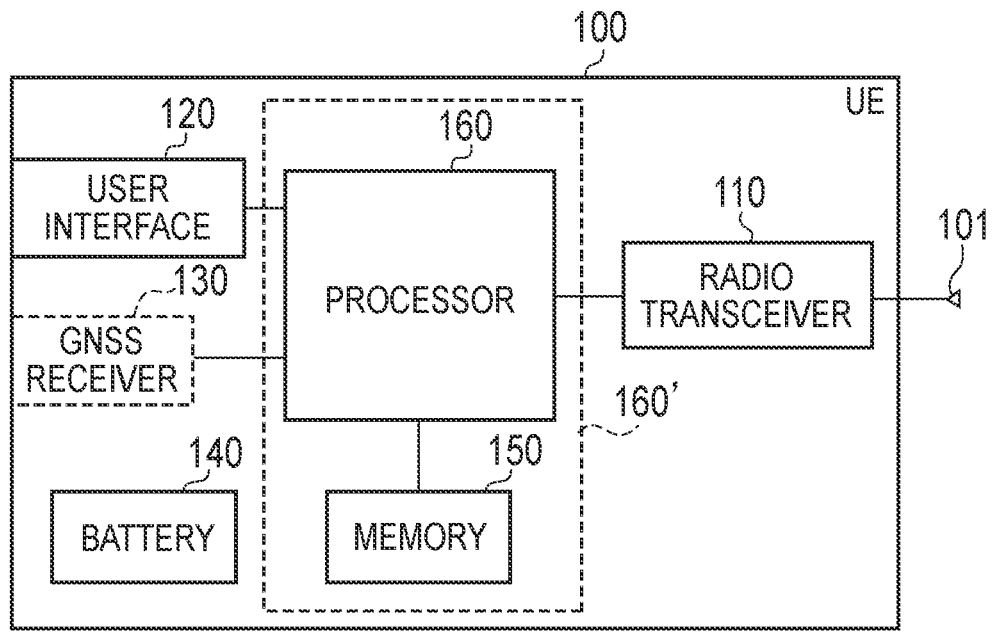
FIG. 2 is a block diagram of a UE.

FIG. 2 is a block diagram of the UE 100. As illustrated in FIG. 2, the UE 100 comprises an antenna 101, a radio transceiver 110, a user interface 120, a GNSS (Global Navigation Satellite System) receiver 130, a battery 140, a memory 150, and a processor 160. The memory 150 corresponds to a storage unit, and the processor 160 corresponds to a controller. The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (transmitted signal) output from the processor 160 into the radio signal, and transmits the radio signal from the antennas 101. Furthermore, the radio transceiver 110 converts the radio signal received by the antennas 101 into the baseband signal (received signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
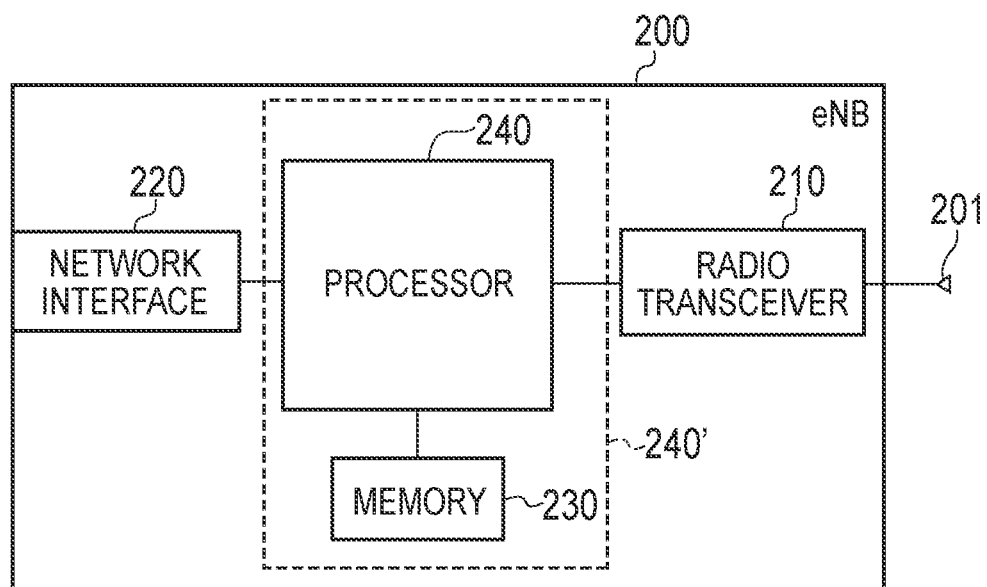
FIG. 3 is a block diagram of an eNB.

FIG. 3 is a block diagram of the eNB 200. As illustrated in FIG. 3, the eNB 200 comprises an antenna 201, a radio transceiver 210, a network interface 220, a memory 230, and a processor 240. It is noted that the memory 230 may be integrally formed with the processor 240, and this set (that is, a chipset) may be called a processor 240'.

The antenna 201 and the radio transceiver 210 are used to transmit and receive a radio signal. The radio transceiver 210 converts the baseband signal (transmitted signal) output from the processor 240 into the radio signal, and transmits the radio signal from the antenna 201. Furthermore, the radio transceiver 210 converts the radio signal received by the antenna 201 into the baseband signal (received signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
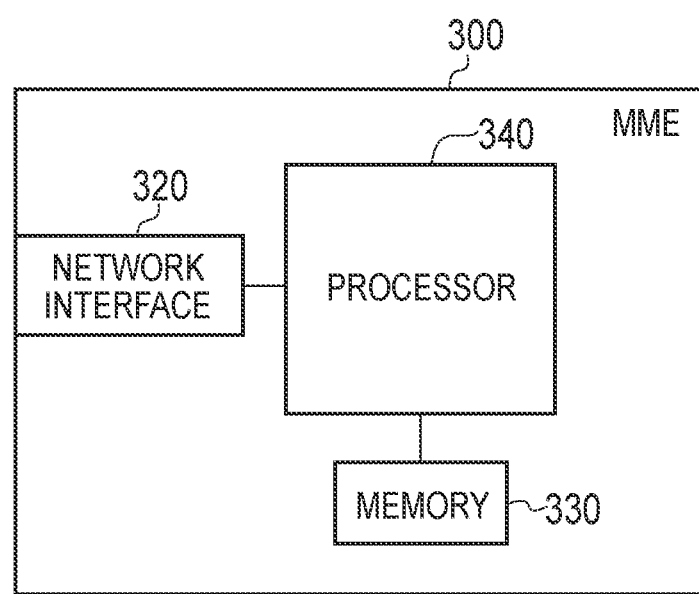
FIG. 4 is a block diagram of an MME.

FIG. 4 is a block diagram of the MME 300. As shown in FIG. 4, the MME 300 comprises a network interface 320, a memory 330, and a processor 340. It is note that the memory 330 may be integrated with the processor 340, and this set (that is, a chipset) may be a processor.

The network interface 320 is connected to the eNB 200 via the S1 interface. The network interface 320 is used in communication performed on the S1 interface.

The memory 330 stores a program to be executed by the processor 340 and information to be used for a process by the processor 340. The processor 340 includes the baseband processor that performs modulation and demodulation, encoding and decoding and the like on the baseband signal and a CPU that performs various processes by executing the program stored in the memory 330. The processor 340 executes various processes and various communication protocols described later.

Figure 5:
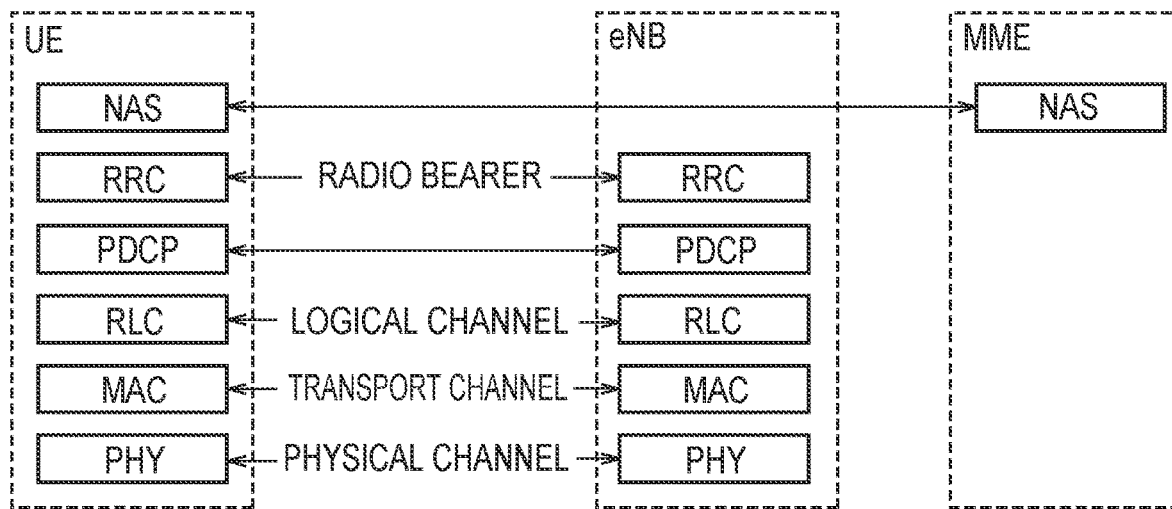
FIG. 5 is a protocol stack diagram.

FIG. 5 is a protocol stack diagram of a radio interface in the LTE system. As illustrated in FIG. 5, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted through the physical channel.

The MAC layer performs preferential control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a scheduler for determining (scheduling) a transport format of an uplink and a downlink (a transport block size, a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane which treats the control signal. Between the RRC layer of the UE 100 and the RRC layer of the eNB 200, a control signal (an RRC message) for various types of configurations is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected mode (a connection state), and when the RRC connection is not established, the UE 100 is in an RRC idle state (an idle state).

A NAS (Non-Access Stratum) layer positioned above the RRC layer performs session management and mobility management, for example.

Figure 6:
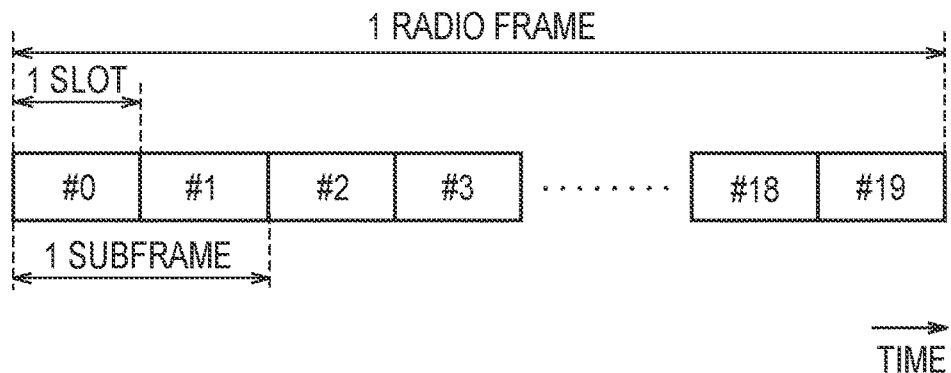
FIG. 6 is a configuration diagram of a radio frame.

FIG. 6 is a configuration diagram of a radio frame used in the LTE system. In the LTE system, OFDMA (Orthogonal Frequency Division Multiple Access) is applied in a downlink (DL), and SC-FDMA (Single Carrier Frequency Division Multiple Access) is applied in an uplink (UL), respectively.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource is configured by a resource block and a time resource is configured by a subframe (or slot).

(Overview of DRX in Idle Mode)

A discontinuous reception (DRX) in the RRC idle mode will be described, below. It is noted that the DRX in the idle mode described below may also include an extended DRX using an extended DRX cycle longer than the conventional DRX cycle. The extended DRX different from the conventional DRX operation will be described later.

The UE 100 can perform the DRX operation to conserve a battery. The UE 100 configured to perform the DRX operation intermittently monitors a PDCCH. Normally, the PDCCH in a subframe carries scheduling information (information on a radio resource and a transport format) of a PDSCH in the subframe.

The UE 100 in the RRC idle mode performs a DRX operation for intermittently monitoring the PDCCH to receive a paging message notifying that there is an incoming call. The UE 100 uses a group identifier for paging (P-RNTI) to decode the PDCCH (CCE) and acquire assignment information of a paging channel (PI). The UE 100 acquires the paging message, based on the assignment information. A PDCCH monitoring timing in the UE 100 is determined, based on an identifier (International Mobile Subscriber Identity (IMSI)) of the UE 100. A calculation of the PDCCH monitoring timing will be described in detail.

The PDCCH monitoring timing (PDCCH monitoring subframe) in the DRX operation in the RRC idle mode is referred to as "Paging Occasion (PO)".

The UE 100 (and the eNB 200) calculates the Paging Occasion (PO) and a Paging Frame (PF) which is a radio frame that may include the Paging Occasion, as follows.

A system frame number (SFN) of the PF is evaluated from the following formula (1).

$$\text{SFN mod } T=(T \text{ div } N)*(\text{UE\_ID mod } N) \quad (1)$$

Here, T is a DRX cycle of the UE 100 for receiving a paging message, and is represented by the number of radio frames. N is a minimum value out of T and nB. nB is a value selected from 4T, 2T, T, T/2, T/4, T/8, T/16, and T/32. UE_ID is a value evaluated by "IMSI mod 1024".

Of the PFs evaluated in this manner, a subframe number of the PO is evaluated as follows. First, index i_s is evaluated by the following formula (2).

$$i\_s=\text{floor}(\text{UE\_ID}/N)\text{mod } Ns \quad (2)$$

Here, Ns is a maximum value out of 1 and nB/T.

Next, the PO corresponding to Ns and the index i_s is obtained from Table 1 or Table 2. Table 1 is applied to an LTE FDD system, and Table 2 is applied to an LTE TDD system. In Table 1 and Table 2, N/A represents not applicable.

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In this manner, the UE 100 determines a paging frame, based on the SFN and the DRX cycle. It is noted that the eNB 200 similarly determines the paging frame, and transmits, in the determined paging frame, a PDCCH for notifying the paging message.

(Operation Related to Extended DRX at Network Side)

Figure 8:
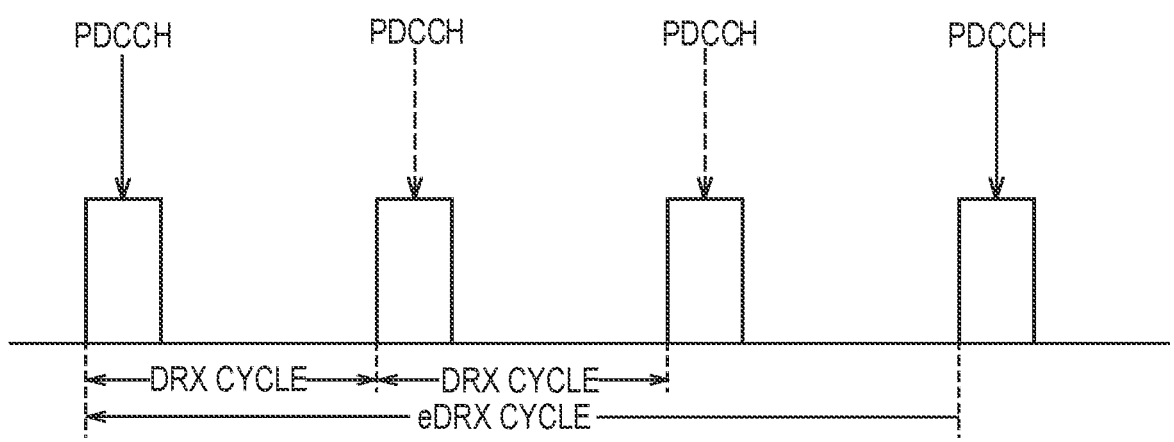
FIG. 8 is a diagram for describing an extended DRX operation according to the embodiment.

Next, an operation related to the extended DRX at the network side will be described in reference with FIGS. 7A to 7C and FIG. 8. FIGS. 7A to 7C are diagrams for describing a configuration of the extended DRX according to the embodiment. FIG. 8 is a diagram for describing the extended DRX operation according to the embodiment.

The extended DRX is configured (applied) to the UE 100 according to at least one of the following three patterns of configuration information. The UE 100 configured with the extended DRX may be a UE of an MTC. Alternatively, the extended DRX may be configured to the UE 100 having a low mobility. For example, the extended DRX is configured to the UE 100 whole location is fixed or to the UE 100 that can perform only a local movement (moves locally within a cell).

In a first pattern, the extended DRX is configured to the UE 100 according to conventional DRX configuration information (PCCH-Config.). As illustrated in FIG. 7A, the eNB 200 notifies, by the conventional PCCH configuration information, the UE 100 of the extended DRX cycle by broadcast. Specifically, the eNB 200 notifies the UE 100 of the PCCH configuration information through SIB2 by broadcast. A value range of the paging cycle (defaultPagingCycle) differs from the conventional PCCH configuration information. The value range of the paging cycle in the PCCH configuration information is extended. That is, a value of the paging cycle longer than a conventional paging cycle can be configured as a value of the paging cycle. The UE 100 recognizes, as a value of the extended DRX cycle, the value of the paging cycle extended in the value range. Specifically, as illustrated in FIG. 7A, it may be possible to configure a value range of "rf512, rf1024, . . . " as the extended DRX cycle (paging cycle). It is noted that the extended DRX cycle described here is a value obtained by multiplying the DRX cycle (paging cycle) by "n".

In a second pattern, the extended DRX is configured to the UE 100 according to information element different from the conventional PCCH configuration information (for example, "Idle-eDRX-Config"). For example, as illustrated in FIG. 7B, the eNB 200 notifies, as an information element different from the conventional PCCH configuration information, the UE 100 of the extended DRX configuration information which is the configuration information of the extended DRX in the idle mode (Idle-eDRX-Config). The eNB 200 notifies, by the extended DRX configuration information, the UE 100 of the extended DRX cycle by broadcast or unicast. If notifying the UE 100 of the extended DRX configuration information by broadcast, the eNB 200 may notify the UE 100 of ePCCH configuration information including the extended DRX configuration information by broadcast. The ePCCH configuration information is configuration information including the extended DRX cycle.

If notifying the UE 100 of the extended DRX configuration information by unicast, the eNB 200 can notify the UE 100 of the extended DRX configuration information by an RRC message. Specifically, the eNB 200 can notify the UE 100 of the extended DRX configuration information (extended DRX cycle) by an RRC connection reconfiguration message. Alternatively, when releasing the RRC connection with the UE 100, the eNB 200 can notify the UE 100 of the extended DRX configuration information (extended DRX cycle). Specifically, the eNB 200 can notify the UE 100 of the extended DRX configuration information by an RRC connection release message (RRCConnectionRelease) for releasing the RRC connection.

The eNB 200 may notify the UE 100 of the extended DRX cycle by unicast without notifying the extended DRX cycle by broadcast. That is, it may be possible for the eNB 200 to notify the UE 100 of the extended DRX cycle only by unicast, under a condition of not transmitting the extended DRX cycle by broadcast. In this case, the eNB 200 can grasp the extended DRX cycle used by the UE 100, and thus, the paging message addressed to the UE 100 can be transmitted to the UE 100 at an appropriate paging timing. As a result, the paging resource can be effectively utilized.

Furthermore, the extended DRX configuration may be configured to the UE 100 by the MME 300. The MME 300 can notify, by an NAS message, the UE 100 of the extended DRX cycle by unicast. The MME 300 may notify subordinate eNBs 200 of the extended DRX cycle configured by the NAS message. As a result, the eNB 200 can grasp the extended DRX cycle used by the UE 100, and thus, the paging resource can be effectively utilized.

The extended DRX configuration information includes information indicating the extended DRX cycle. As illustrated in FIG. 7B, the extended DRX cycle may be a value of "rf8, rf16 . . . , rf512, rf 1024, . . . rf8192, . . . ", for example. It is noted that not only a value longer than the conventional DRX cycle, but also a value shorter than the conventional DRX cycle may be configured to the extended DRX cycle. In this case, the paging cycle can be shortened, and thus, the UE 100 in the idle mode can respond to the paging in high-speed.

Furthermore, the extended DRX configuration information may include a plurality of values for information indicating the extended DRX cycle. The UE 100 selects one value out of the plurality of values as the extended DRX cycle. For example, the UE 100 selects the extended DRX cycle in accordance with the user preference. As a result, the extended DRX operation in accordance with the user preference can be executed.

The UE 100 may notify the eNB 200 or the MME 300 of the selected extended DRX cycle. Furthermore, if receiving the selected extended DRX cycle from the UE 100, the eNB 200 may notify the MME 300 of the extended DRX cycle received from the UE 100. In addition, the MME 300 may also notify the eNB 200 of the extended DRX cycle received from the UE 100.

Furthermore, the extended DRX cycle may be a value obtained by multiplying the DRX cycle (paging cycle) by "n". In the example illustrated in FIG. 8, a value obtained by multiplying the conventional DRX cycle by "3" is the extended DRX cycle. For example, if the UE 100 configured with the extended DRX is the UE of the MTC, regardless of the conventional paging cycle, the PDCCH may not need to be monitored at timing other than the paging timing based on the extended DRX configuration information (timing designated by "Idle-eDRX-Config"). In the example of FIG. 8, if monitoring a first PDCCH, the UE 100 may not need to monitor the PDCCH at a second or a third paging timing. Alternatively, if the configured QoS is satisfied, the UE 100 may not need to monitor the PDCCH at timing other than the paging timing based on the extended DRX configuration information. Furthermore, the eNB 200 may transmit a paging message at the paging timing based on the conventional PCCH configuration information. Alternatively, the eNB 200 may transmit a paging message addressed to the UE 100 at the paging timing based on the extended DRX configuration information.

Furthermore, the extended DRX cycle may be designated by immediate data by the eNB 200 or the MME 300. That is, the eNB 200 or the MME 300 may designate the system frame number (SFN) of the paging frame (PF) by immediate data.

Furthermore, the extended DRX cycle may be indicated by a periodic function in which the cycle of the DRX cycle changes as time elapses. For example, the extended DRX cycle may be a periodic function indicating "intervals of one minute for a first 10 cycles, intervals of five minutes for a subsequent 10 cycles, intervals of one minute for another subsequent 10 cycles, . . . ".

In a third pattern, the extended DRX is configured to the UE 100 by a coefficient parameter ("pagingCycleFactor") for real-number multiplying the conventional DRX cycle. For example, as illustrated in FIG. 7C, the eNB 200 notifies the UE 100 of the ePCCH configuration information (ePCCH-Config) including the coefficient parameter (pagingCycleFactor). The eNB 200 notifies, by the ePCCH configuration information, the UE 100 of the coefficient parameter by broadcast or unicast. The MME 300 may notify the UE 100 of the coefficient parameter by the NAS message.

The coefficient parameter is a parameter for real-number multiplying the conventional DRX cycle. The UE 100 calculates the extended DRX cycle, based on the paging cycle (DRX cycle) received from the conventional PCCH configuration information and the coefficient parameter.

Furthermore, the UE 100 determines the paging frame (PF), based on the calculated extended DRX cycle and nB received from the conventional PCCH configuration information. nB is a parameter indicating a number of paging opportunities in the paging cycle. That is, nB depends on the number of paging in the paging cycles of the eNB 200. Here, as described above, nB is a value selected from "4T, 2T, T, T/2, T/4, T/8, T/16, and T/32". In the formula (1) used for determining the PF, T may be divided by nB, and thus, if nB is T/32, the PF becomes a decimal number, if T is not multiples of 32. Therefore, there is a concern that if calculating the extended DRX cycle from the conventional DRX cycle and the coefficient parameter, an appropriate SFN of the PF may not be determined.

Therefore, if a condition established according to the extended DRX cycle and nB is not satisfied, the extended DRX cycle is corrected. Here, a condition established according to the extended DRX cycle and nB means that a value obtained by multiplying the extended DRX cycle and nB is an integral number. Therefore, the UE 100 corrects the extended DRX cycle, based on the value in accordance with a denominator of nB. That is, if nB=T/m, the UE 100 corrects the extended DRX cycle in accordance with m. Specifically, the UE 100 multiplies the extended DRX cycle by m. Thus, the value obtained by multiplying the extended DRX cycle and nB becomes an integral number. The UE 100 may add a predetermined value to the value obtained by multiplying the extended DRX cycle by m. The predetermined value may be a value within a range based on a value of m. Thus, a flexible extended DRX cycle is configured. The predetermined value may be included in the ePCCH configuration information. Alternatively, the UE 100 may notify the eNB 200 or the MME 300 of the predetermined value.

Alternatively, the calculated extended DRX cycle may be corrected to a multiple of m closest to the extended DRX cycle. For example, if nB=T/4 and the extended DRX=69, from "1/nB*(FLOOR (nB*69)", the extended DRX may be corrected to 68.

Meanwhile, the eNB 200 similarly calculates and corrects the extended DRX cycle, and determines the appropriate (SFN of the) PF. The eNB 200 can transmit the PDCCH by the determined PF.

As described above, the extended DRX can be configured to the UE 100 by any one of the above-described three patterns of configuration information.

Furthermore, the eNB 200 or the MME 300 can determine whether or not to configure the extended DRX to the UE 100 by following methods.

In a first method, the eNB 200 makes a determination, based on "UEInformationResponse". The eNB 200 transmits a message for requesting UE information (UEInformationRequest) to the UE 100. The UE 100 transmits a response message for the message (UEInformationResponse) to the eNB 200. If the response message includes a mobility history report (mobilityHistoryReport), the eNB 200 determines whether or not to configure the extended DRX to the UE 100, based on the mobility history report. The mobility history report is information indicating a staying time in a cell in which the UE 100 most recently stayed or a cell that the UE 100 most recently left. If the staying time in a cell in which the UE 100 exists (stays) exceeds a threshold value, the eNB 200 determines to configure the extended DRX to the UE 100. Otherwise, the eN 200 determines not to configure the extended DRX to the UE 100.

In a second method, the eNB 200 determines whether or not to configure the extended DRX to the UE 100, based on "Expected UE Behaviour". If an "INITIAL CONTEXT SETUP REQUEST" message received from the MME 300 includes the "Expected UE Behaviour" related to a behaviour of the UE 100, the eNB 200 determines whether or not to configure the extended DRX to the UE 100, based on the "Expected UE Behaviour". The "Expected UE Behaviour" is information indicating a predicted active behaviour and/or mobility behaviour of the UE. For example, the "Expected UE Behaviour" is information indicating an active time and/or idle time of the UE 100. The "Expected UE Behaviour" is information indicating a predicted time interval of inter-base station handovers (inter-eNB handovers). If "long-time" is included in the "Expected UE Behaviour", the interval of the inter-base station handover is predicted to be longer than 180 seconds. It is noted that the MME 300 can determine the "Expected UE Behaviour", based on subscriber information, statistics information, and the like. If a time indicated by the "Expected UE Behaviour" (for example, predicted time interval of the inter-base station handover) exceeds a threshold value, the eNB 200 determines to configure the extended DRX to the UE 100. Otherwise, the eN 200 determines not to configure the extended DRX to the UE 100.

It is noted that if a "HANDOVER REQUEST" message received from a source eNB 200 includes the "Expected UE Behaviour", the eNB 200 may determine whether or not to configure the extended DRX to the UE 100, based on the "Expected UE Behaviour".

In a third method, if a "UEAssistanceInformation" message received from the UE 100 includes "powerPreIndication", the eNB 200 determines whether or not to configure the extended DRX to the UE 100, based on the "powerPreIndicaton". The "powerPreIndication" indicates an optimized setting (preferred by the UE) for power saving. Alternatively, the "powerPreIndication" indicates a normal setting. If the "powerPreIndication" includes information indicating "LowPowerConsumption" indicating a low power consumption, the eNB 200 may determine to configure the extended DRX to the UE 100.

In a fourth method, the eNB 200 determines whether or not to configure the extended DRX to the UE 100, based on "extendedLowPowerConsumption". If receiving a message including the "extendedLowPowerConsumption" from the UE 100, the eNB 200 determines to configure the extended DRX to the UE 100. The "extendedLowPowerConsumption" is information indicating that the UE 100 prefers further lower power consumption than the "LowPowerConsumption" indicating that the UE 100 prefers the low power consumption. The UE 100 may transmit, to the eNB 200, the "powerPreIndication" including the "extendedLowPowerConsumption" by the "UEAssistanceInformation" message. Alternatively, the UE 100 may include the "extendedLowPowerConsumption" in a field different from the "powerPrefIndication" and transmit to the eNB 200 by the "UEAssistanceInformation" message. Alternatively, the Ue 100 may transmit the "extendedLowPowerConsumption" to the eNB 200 by a message different from the "UEAssistanceInformation". Only the UE having a low mobility and/or the UE applying to the MTC may be capable of transmitting the "extendedLowPowerConsumption" to the eNB 200.

From any one of the above-described methods, if determining to configure the extended DRX to the UE 100, the eNB 200 notifies the UE 100 of the DRX cycle by unicast. It is noted that the MME 300 can also determine whether or not to configure the extended DRX to the UE 100, similarly to the eNB 200.

Here, if the eNB 200 notifies the UE 100 of an extended DRX cycle longer than an implicit detach timer, the eNB 200 can execute an operation for stopping the implicit detach timer.

The implicit detach timer is a timer for the network to detach the UE 100 upon expiration before the UE 100 contacts the network. If the UE 100 configured with the extended DRX cycle longer than the implicit detach timer executes the extended DRX operation, the implicit detach timer expires. As a result, there is a concern that the network detaches the UE 100, and thus, the UE 100 cannot appropriately execute the extended DRX operation.

Therefore, the eNB 200 can execute the operation for stopping the implicit detach timer. Specifically, the eNB 200 notifies a network node for managing the implicit detach timer (for example, the MME 300) of the extended DRX cycle configured (or planned to be configured) to the UE 100. If the extended DRX cycle is longer than the implicit detach timer, the network node can stop (OFF) the implicit detach timer of the UE 100. Alternatively, if the implicit detach timer is managed in the eNB 200, and if the extended DRX cycle is longer than the implicit detach timer, the eNB 200 can stop (OFF) the implicit detach timer of the UE 100.

It is noted that even in a case where the extended DRX cycle is configured to the UE 100, if the MME 300 manages the implicit detach timer in the MME 300, and if the extended DRX cycle is longer than the implicit detach timer, the MME 300 can stop (OFF) the implicit detach timer of the UE 100. Alternatively, the MME 300 may notify the network node for managing the implicit detach timer of a message for stopping the implicit detach timer. It is noted that the eNB 200 can also notify the network node for managing the implicit detach timer of the message.

(Operation Related to Extended DRX at UE Side)

Next, an operation related to the extended DRX at the UE side will be described. First, the configuration (application) of the extended DRX will be described.

If receiving the extended DRX configuration information from the network (the eNB 200 or the MME 300), the UE 100 configures the extended DRX (extended DRX cycle).

Here, a case is assumed where the UE 100 is notified of a first extended DRX cycle by broadcast from the eNB 200, and is notified of a second extended DRX cycle by unicast from the MME 300. In the conventional DRX cycle, the UE 100 uses a shorter DRX cycle, out of the DRX cycle notified by the eNB 200 and a second extended DRX cycle notified by the MME 300, to execute the DRX operation in the idle mode. If a case is assumed where the extended DRX cycle can be configured without being limited by the conventional paging cycle (multiples of 32 radio frames), it is thought that the UE 100 monitors the PDCCH at timing based on the first extended DRX cycle and monitors the PDCCH at timing based on the second extended DRX cycle. However, there is a concern that the timing monitored by the UE 100 increases, and thus, the power consumption cannot be reduced even if the extended DRX operation is executed. Furthermore, it is inefficient because the eNB 200 must transmit the paging message at the timing based on the first extended DRX cycle, and must transmit the paging message at the timing based on the second extended DRX cycle.

Therefore, it is preferable that the UE 100 preferentially configures (applies) the second extended DRX cycle received from the MME 300. This is because the MME 300 determines the extended DRX cycle for each UE 100, and thus, the extended DRX cycle notified by the MME by unicast is more likely to be suitable for the UE 100 than the extended DRX cycle notified by the eNB 200 by broadcast. Therefore, the UE 100 preferentially uses the second extended DRX cycle. The UE 100 may notify the eNB 200 of the configured (applied) second extended DRX cycle. Alternatively, after notifying the UE 100 of the second extended DRX cycle, the MME 300 may notify the eNB 200 of the second extended DRX cycle.

Meanwhile, not all eNBs 200 necessarily support the extended DRX. The eNB 200 not supporting the extended DRX cannot notify the paging message at the timing based on the extended DRX cycle. Therefore, there is a concern that if the UE 100 preferentially uses the extended DRX cycle, the paging message cannot be received.

Therefore, if the eNB 200 managing the cell in which the UE 100 exists cannot notify the paging message, based on the extended DRX cycle, the UE 100 configures (applies) the DRX cycle notified by the eNB 200 and uses the DRX cycle. Thus, a problem where the UE 100 cannot receive the paging message due to the application of the extended DRX does not occur.

The UE 100 can determine whether or not the eNB 200 managing the cell in which the UE 100 exists supports the extended DRX, based on the extended DRX configuration information. If successfully receiving the extended DRX configuration information from the eNB 200 managing the cell in which the UE 100 exists, the UE 100 determines that the eNB 200 supports the extended DRX. If the extended DRX configuration information cannot be received from the eNB 200, the UE 100 determines that the eNB 200 does not support the extended DRX. For example, if successfully receiving an SIB notifying the extended DRX cycle from the eNB 200, the UE 100 determines that the eNB 200 supports the extended DRX.

Next, an operation of the UE 100 executing the extended DRX will be described.

The UE 100 configured with the extended DRX (extended DRX cycle) uses, after moving to the idle mode, the extended DRX cycle to execute the extended DRX operation, based on the configured extended DRX. The UE 100 monitors the PDCCH at the timing based on the extended DRX cycle.

Here, the UE 100 can confirm the system frame number (SFN) of the cell (eNB 200) in which the UE 100 exists, before the synchronization shift occurs. Specifically, if the extended DRX cycle is longer than the predetermined period, during execution of the DRX operation, the UE 100 receives the system frame number from the existing cell (eNB 200), before an elapse of the predetermined period. The UE 100 synchronizes, based on the received system frame number. It is noted that the cell (eNB 200) transmits the system frame number managed by the eNB 200 through a master information block (MIB) or a system information block (SIB) by broadcast.

Here, the predetermined period is a value corresponding to the performance of the crystal oscillator provided in the UE 100 and configured to measure a time period. The value corresponding to the performance of the crystal oscillator refers to a value shorter than the time during which the synchronization shift between the UE 100 and the eNB 200 occurs.

The UE 100 stores, in the memory 150, the value corresponding to the performance of the crystal oscillator. The UE 100 may store the value corresponding to the performance of the crystal oscillator in advance. Alternatively, the UE 100 may calculate the value corresponding to the performance of the crystal oscillator, based on the synchronization shift with the eNB 200.

For example, a case is assumed where the extended DRX cycle is 24 hours, and the value corresponding to the performance of the crystal oscillator is 12 hours. There is a concern that if the UE 100 monitors the PDCCH again 24 hours after monitoring the PDCCH, the synchronization shift occurs and the PDCCH cannot be monitored. Therefore, the UE 100 receives the system frame number from the cell (eNB 200) before the 12 hours (predetermined period) elapses. Thus, the UE 100 can synchronize before the synchronization shift occurs, even if using the extended DRX cycle longer than the conventional DRX cycle.

Operation Example According to Embodiment

Next, an operation example according to the embodiment will be described. Description of similar portions to that in each operation example will be omitted where appropriate.

(1) Operation Example 1

Figure 9:
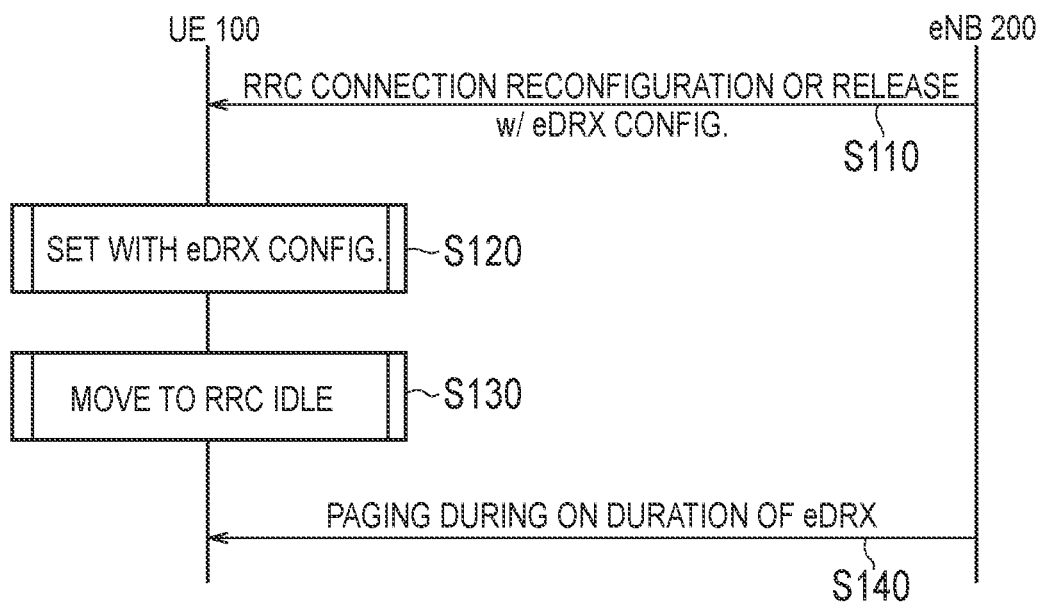
FIG. 9 is a sequence diagram for describing an operation example 1 according to the embodiment.

An operation example 1 will be described in reference with FIG. 9. FIG. 9 is a sequence diagram for describing the operation example 1 according to the embodiment.

In FIG. 9, the UE 100 has established the RRC connection with the eNB 200 and is in the connected mode.

As illustrated in step S110, the eNB 200 notifies the UE 100 of the extended DRX configuration information (extended DRX cycle) by the RRC connection reconfiguration message or the RRC connection release message. The eNB 200 may transmit the extended DRX configuration information only by unicast without transmitting the extended DRX configuration information by broadcast.

In step S120, the UE 100 performs a setting, based on the extended DRX configuration information.

In step S130, the UE 100 moves to the idle mode. Thereafter, the UE 100 starts the extended DRX operation using the extended DRX cycle.

In step S140, the eNB 200 transmits a paging message at the timing based on the extended DRX cycle. That is, the eNB 200 transmits the paging message at timing in which the UE 100 monitors the PDCCH, based on the extended DRX cycle. Meanwhile, the UE 100 monitors the PDCCH at the timing based on the extended DRX cycle. Thus, the UE 100 can confirm, by monitoring the PDCCH, if the paging message addressed to the UE 100 is received.

(2) Operation Example 2

Figure 10:
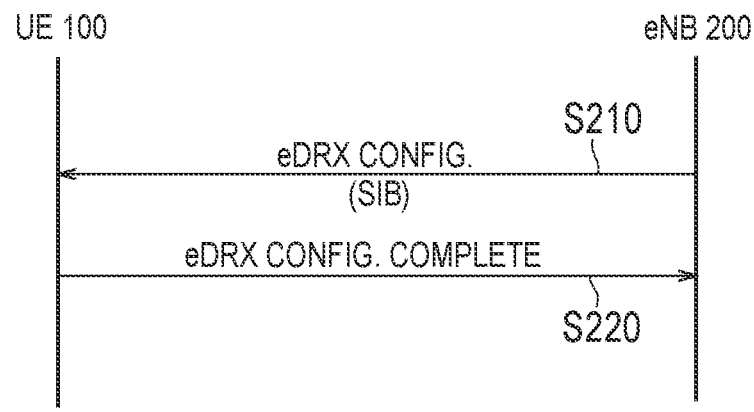
FIG. 10 is a sequence diagram for describing an operation example 2 according to the embodiment.

Next, an operation example 2 will be described in reference with FIG. 10. FIG. 10 is a sequence diagram for describing the operation example 2 according to the embodiment.

In the operation example 2, the eNB 200 notifies the UE 100 of the extended DRX configuration information by broadcast.

In step S210, the eNB 200 notifies the UE 100 of the extended DRX configuration information (extended DRX cycle) through the SIB by broadcast. The UE 100 performs a setting, based on the received extended DRX configuration information. That is, the UE 100 configures the extended DRX cycle.

In step S220, if the extended DRX cycle received by broadcast is configured, the UE 100 transmits a notification with an indication that the extended DRX cycle has been configured (eDRX config. complete) to the eNB 200. If in the idle mode, the UE 100 transmits the notification to the eNB 200 after moving to the connected mode. It is noted that when transmitting the notification to the eNB 200, the UE 100 may be allocated, from the eNB 200, with a designated resource for the notification by the scheduling request and the like. The dedicated resource may be for the PUSCH and may be for the PUCCH. It is noted that when transmitting the notification by the PUCCH, the UE 100 may transmit the notification by the dedicated message (eDRX Configured Message and the like).

Thus, the eNB 200 can grasp that the UE 100 uses the extended DRX cycle. Therefore, the eNB 200 can transmit the paging message at the timing based on the extended DRX cycle without transmitting the paging message at the timing based on the conventional DRX cycle. As a result, the paging resource can be effectively utilized.

(3) Operation Example 3

Figure 11:
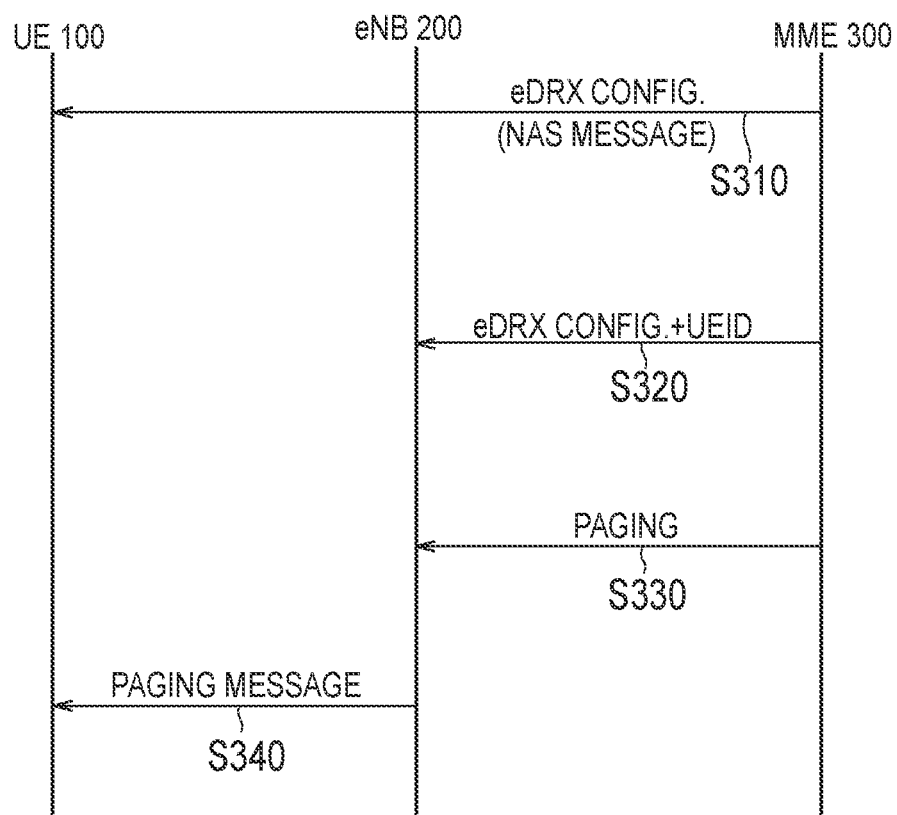
FIG. 11 is a sequence diagram for describing an operation example 3 according to the embodiment.

Next, an operation example 3 will be described in reference with FIG. 11. FIG. 11 is a sequence diagram for describing the operation example 3 according to the embodiment.

In the operation example 3, the MME 300 notifies the UE 100 of the extended DRX configuration information.

In step S310, the MME 300 notifies the UE 100 of the extended DRX configuration information (extended DRX cycle) by the NAS message. The UE 100 performs a setting, based on the received extended DRX configuration information.

In step S320, the MME 300 notifies the eNB 200 of the extended DRX configuration information notified to the UE 100 and the identifier of the UE 100 (for example, IMSI). Thus, the eNB 200 can grasp the extended DRX cycle used by the UE 100. The eNB 200 may notify the eNB 200 of a list of identifiers of the UE 100 configured with the extended DRX configuration information. The list is information in which the identifier of the UE 100 and the extended DRX cycle are associated.

In step S330, the MME 300 notifies the eNB 200 of the paging addressed to the UE 100. The eNB 200 determines whether or not the destination of the paging received from the MME 300 matches the identifier of the UE 100 received from the MME 300. Alternatively, the eNB 200 determines whether or not the destination of the paging received from the MME 300 is included in the list.

In step S340, if the destination of the paging and the identifier of the UE 100 match, the eNB 200 transmits a paging message at the timing based on the extended DRX cycle corresponding to the identifier of the UE 100. Otherwise, the eNB 200 transmits the paging message at the timing based on the conventional DRX cycle.

Alternatively, if the destination of the paging received from the MME 300 is included in the list, the eNB 200 transmits the paging message at the timing based on the extended DRX cycle corresponding to the identifier of the UE 100 included in the list. Otherwise, the eNB 200 transmits the paging message at the timing based on the conventional DRX cycle.

Thus, the eNB 200 can appropriately determine the timing for transmitting the paging message, and thus, the paging resource can be effectively utilized.

It is noted that if the eNB 200 grasps the extended DRX cycle to be configured to the UE 100, the eNB 200 may receive, from the MME 300, only the identifier (list) of the UE 100 configured with the extended DRX cycle. It is noted that if the eNB 200 and the MME 300 configure the extended DRX cycle to the UE 100 according to the similar principle, the eNB 200 can grasp the extended DRX cycle to be configured to the UE 100.

(4) Operation Example 4

Figure 12:
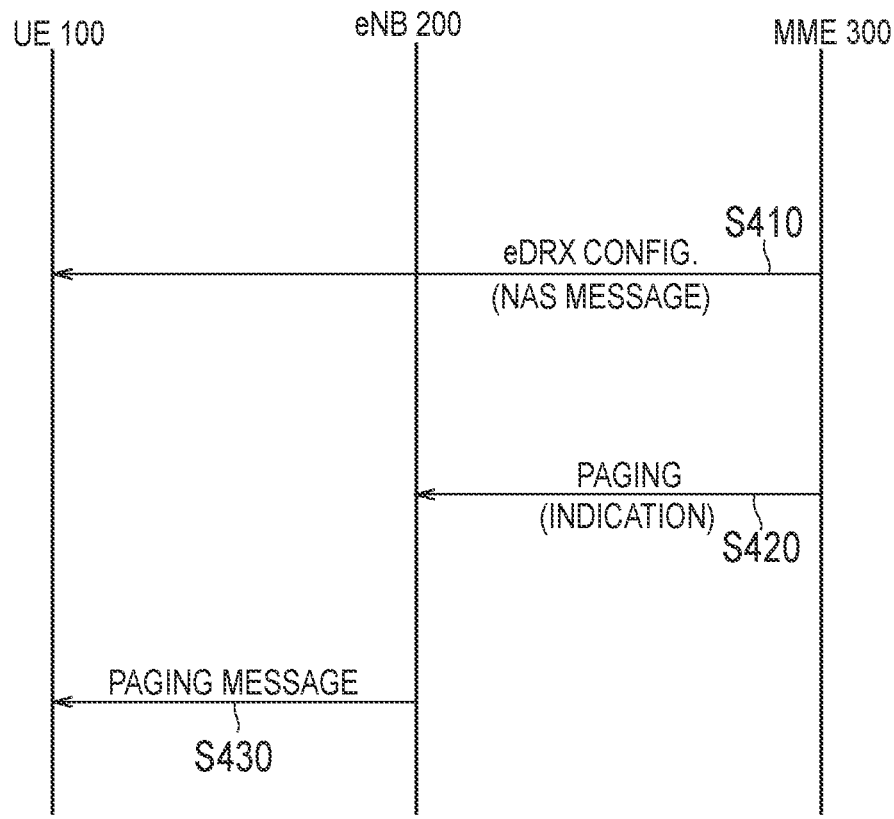
FIG. 12 is a sequence diagram for describing an operation example 4 according to the embodiment.

Next, an operation example 4 will be described in reference with FIG. 12. FIG. 12 is a sequence diagram for describing the operation example 4 according to the embodiment.

In the operation example 4, the MME 300 notifies the eNB 200 of the paging including identification information indicating that the destination of the paging is the UE 100 configured with the extended DRX cycle.

Step S410 corresponds to step S310.

In step S420, the MME 300 notifies the eNB 200 of the paging addressed to the UE 100. Here, the paging includes the identification information (indication) indicating that the destination of the paging is the UE 100 configured with the extended DRX cycle. The eNB 200 can grasp that the received paging is addressed to the UE 100 configured with the extended DRX cycle. The paging may include information indicating the extended DRX cycle configured to the UE 100.

In step S430, the eNB 200 transmits the paging message at the timing based on the extended DRX cycle. It is noted that if the paging does not include the identification information, the eNB 200 transmits the paging message at the timing based on the conventional DRX cycle.

Thus, the eNB 200 can appropriately determine the timing for transmitting the paging message, and thus, the paging resource can be effectively utilized.

(5) Operation Example 5

Figure 13:
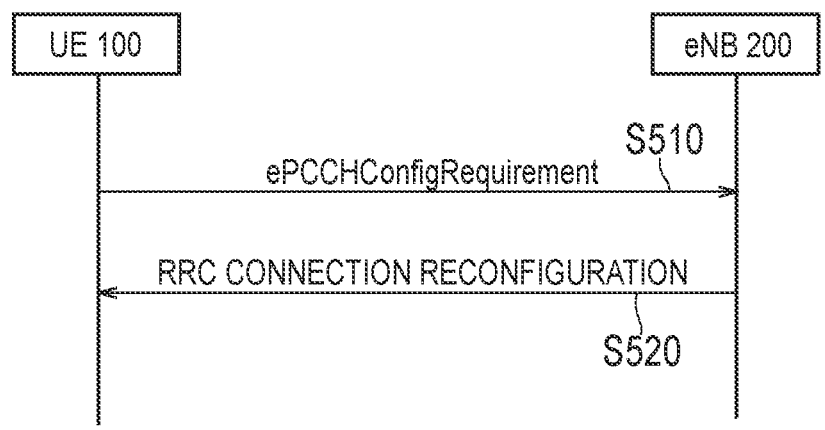
FIG. 13 is a sequence diagram for describing an operation example 5 according to the embodiment.

Next, regarding an operation example 5, FIG. 13 is a sequence diagram for describing the operation example 5 according to the embodiment.

In the operation example 5, the UE 100 notifies the eNB 200 of the desired extended DRX cycle.

As illustrated in FIG. 13, in step S510, the UE 100 notifies the eNB 200 of request information (ePCCHConfigReuirement) on the desired extended DRX cycle.

The UE 100 determines, in accordance with an application to be used, the desired extended DRX cycle. The UE 100 may indicate the extended DRX cycle by immediate data. That is, the UE 100 may designate the system frame number (SFN) of the paging frame (PF) by immediate data. The UE 100 includes the extended DRX cycle indicated by immediate data into the request information. Alternatively, the UE 100 may include, into the request information, the extended DRX cycle indicated by the periodic function in which the cycle of the DRX cycle changes as time elapses.

Alternatively, the UE 100 may determine the desired extended DRX cycle in accordance with the performance of the crystal oscillator provided in the UE 100 and configured to measure a time period. Specifically, the UE 100 determines, as the desired extended DRX cycle, a value shorter than the time during which the synchronization shift between the UE 100 and the eNB 200 occurs. Thus, the UE 100 can monitor the PDCCH before the synchronization shift occurs, even if using the extended DRX cycle longer than the conventional DRX cycle.

Furthermore, the UE 100 may include the list of the desired extended DRX cycle into the request information. The list can include information of a plurality of ranked extended DRX cycles. For example, the list includes information of first to third desired extended DRX cycles.

The eNB 200 determines the extended DRX cycle to be configured to the UE 100, based on the desired extended DRX cycle included in the request information. If the desired extended DRX cycle is allowed, the eNB 200 includes the extended DRX cycle into the configuration information. Meanwhile, if the desired extended DRX cycle is not allowed, the eNB 200 includes an extended DRX cycle different from the desired extended DRX cycle into the configuration information.

In step S520, the eNB 200 notifies the UE 100 of the configuration information including the extended DRX cycle by an RRC message (RRCconnectionreconfiguration) by unicast. The UE 100 performs a setting, based on the configuration information.

As described above, the UE 100 can notify the eNB 200 of the desired extended DRX cycle. The UE 100 can determine the extended DRX cycle, based on information unknown to the network node. The information unknown to the network node is, for example, delay tolerance allowed by an application used by the UE 100, the performance of the crystal oscillator provided in the UE 100, and the like. As a result, the extended DRX operation can be executed to the UE 100 by using an efficient extended DRX cycle.

It is noted that if the UE 100 selects a cell managed by another eNB 200 by a cell reselection process, the other eNB 200 does not grasp the extended DRX cycle desired by the UE 100, and thus, the configured DRX cycle is wasted. Therefore, it is desirable that the UE 100 has a low mobility.

It is noted that the UE 100 may notify the MME 300 of the request information, in place of the eNB 200. In this case, the MME 300 notifies, by the NAS message, the UE 100 of the extended DRX cycle determined based on the request information.

Other Embodiments

In the above-described embodiment, the extended DRX configuration information may include, in addition to the extended DRX cycle, time information on start timing of the extended DRX cycle. The UE 100 starts the extended DRX operation at the start timing indicated by the time information. Therefore, the extended DRX cycle starts from the start timing indicated by the time information. It is noted that in this case, the extended DRX cycle may be a cycle not relying on the conventional PF and SFN. Furthermore, the time information may be indicated by UTC (Coordinated Universal Time).

Furthermore, the time information may include information (offset value) indicating the period between the start timing and the timing for monitoring the downlink control channel. It is noted that if the time information does not include the offset value, the UE 100 may omit, after monitoring the PDCCH from the start timing, the monitoring of the PDCCH until one extended DRX cycle ends.

Therefore, in the above-described embodiment, the eNB 200 and the MME 300 can notify the UE 100 of the extended DRX configuration information including the time information. Furthermore, if the extended DRX configuration information is notified to the UE 100, the MME 300 can notify the eNB 200 of the extended DRX cycle, the time information, and the identifier of the UE 100.

Alternatively, the extended DRX configuration information may include, as the extended DRX cycle, a timer indicating a period during which the monitoring of the PDCCH for receiving the paging message is omitted. That is, an expiration value of the timer indicates the length of the extended DRX cycle. While the timer is activated, the UE 100 omits the PDCCH monitoring even at the PDCCH monitoring timing in the conventional DRX operation. That is, while the timer is activated, the PDCCH monitoring is not required, and thus the UE 100 does not need to perform the PDCCH monitoring. When the timer expires, the UE 100 restarts the conventional DRX operation. It is noted that the UE 100 can start the timer, based on the time information.

Therefore, in the above-described embodiment, the eNB 200 and the MME 300 can notify the UE 100 of the extended DRX configuration information including the timer as the extended DRX cycle. Furthermore, if the MME 300 notifies the UE 100 of the extended DRX configuration information, the MME 300 can notify the eNB 200 of the timer, time information, and the identifier of the UE 100.

In the above-described embodiment, if the MME 300 notifies the UE 100 of the extended DRX, the MME 300 notifies the eNB 200 of the extended DRX configuration information and the identifier of the UE 100. However, if the MME 300 notifies the UE 100 of the conventional DRX configuration information, the MME 300 may notify the eNB 200 of the DRX configuration information and the identifier of the UE 100. Alternatively, the MME 300 may notify the eNB 200 of the extended DRX configuration information and the identifier of the UE 100, only if the MME 300 notifies the UE 100 of the extended DRX. The eNB 200 transmits, to the UE 100 indicated by the identifier of the UE 100, the paging message at the timing based on the extended DRX cycle corresponding to the identifier of the UE 100.

In the above-described embodiment, if the MME 300 notifies the UE 100 of the extended DRX configuration information, the MME 300 notifies the eNB 200 of the extended DRX configuration information and the identifier of the UE 100. However, the MME 300 may notify the eNB 200 of information indicating whether or not the extended DRX cycle is configured (applied) to the UE 100.

Conventionally, if the UE 100 moves to the RRC idle mode, the eNB 200 discards information (UE context) on the UE 100. Meanwhile, if receiving information indicating that the extended DRX cycle is configured to the UE 100, the eNB 200 maintains the "UE Context" of the UE 100 without discarding, even if the UE 100 moves to the RRC idle mode. If the extended DRX cycle is configured to the UE 100, the eNB 200 that has discarded the "UE Context" of the UE 100 stores the identifier of the UE 100 received along with the information indicating that the extended DRX cycle is configured to the UE 100. Thus, the eNB 200 can understand the UE 100 configured with the extended DRX cycle. If receiving the paging addressed to the UE 100 configured with the extended DRX cycle, the eNB 200 can transmit the paging message at the timing based on the extended DRX cycle (or extended DRX cycle prescribed in advance) notified from the MME 300.

It is noted that if receiving information indicating that the extended DRX cycle is not configured to the UE 100 (for example, information indicating that the conventional DRX cycle is applied to the UE 100), the eNB 200 discards the "UE Context" of the UE 100 when the UE 100 moves to the RRC idle mode. Furthermore, if maintaining the "UE Context" without discarding, the eNB 200 may activate the timer when the UE 100 moves to the RRC idle mode. If the timer expires, the eNB 200 may discard the "UE Context".

Furthermore, the MME 300 may notify the eNB 200 of capability information of the UE 100 indicating whether or not the extended DRX cycle is applicable to the UE 100. It is noted that the UE 100 can notify the MME 300 of the capability information indicating whether or not the extended DRX cycle is applicable to the UE 100, by the NAS message.

The eNB 200 can determine whether or not the extended DRX cycle is applicable to the UE 100, based on the capability information of the UE 100 received from the MME 300. If the extended DRX cycle is applicable to the UE 100, the eNB 200 maintains the "UE Context" of the UE 100 without discarding, even if the UE 100 moves to the RRC idle mode. If the extended DRX cycle is applicable to the UE 100, the eNB 200 that has discarded the "UE Context" of the UE 100 stores the identifier of the UE 100 received along with the capability information of the UE 100. Thus, the eNB 200 can understand the UE 100 to which the extended DRX cycle is applicable. If receiving the paging addressed to the UE 100 applied with the extended DRX cycle, the eNB 200 can transmit the paging message at the timing based on the extended DRX cycle (or the extended DRX cycle prescribed in advance) notified from the MME 300.

It is noted that if receiving the capability information indicating that the extended DRX cycle cannot be applied to the UE 100, the eNB 200 discards the "UE Context" of the UE 100 if the UE 100 moves to the RRC idle mode. Furthermore, if maintaining the "UE Context" without discarding as described above, the eNB 200 may activate the timer for discarding the "UE Context", if the UE 100 moves to the RRC idle mode.

In the above-described embodiment, although the extended DRX in the idle mode has been described, this is not limiting. Unless a problem incapable of being solved occurs, the operation of the above-described embodiment is applicable to the extended DRX in the connected mode. A DRX in the connected mode will be described, below.

The UE 100 in the DRX state in the connected mode intermittently monitors the PDCCH. The cycle in which the PDCCH is monitored is referred to as "DRX cycle". Furthermore, monitoring duration occurring every DRX cycle is referred to as "On duration". The "On duration" is also referred to as "wake-up duration". A duration during which the PDCCH does not need to be monitored is also referred to as "sleep duration" (or "Opportunity for DRX").

Downlink data is transmitted via the PDSCH, and scheduling information of the PDSCH is included in the PDCCH. If the scheduling information is detected via the PDCCH in "On duration", the UE 100 can receive data designated by the scheduling information.

The conventional DRX cycle includes a short DRX cycle and a long DRX cycle. The duration length of the short DRX cycle and the duration length of the long DRX cycle are the same in "On duration", but different in the sleep duration. For example, the "On duration" can be set from 1 ms to 200 ms by an "On duration timer". The long DRX cycle (and the offset time) is configured by "longDRX-CycleStartOffset", and the short DRX cycle is configured by "shortDRX-Cycle". It is noted that in the 3GPP specifications, if the DRX is configured, the long DRX is a mandatory function and the short DRX is an optional function. Therefore, even if the long DRX cycle is configured, the short DRX cycle is sometimes not configured in the UE 100.

The DRX is controlled, based on a plurality of timers, as described below.

"drx-InactivityTimer": (timer for specifying) the number of consecutive subframes (PDCCH subframes) after correctly decoding the PDCCH indicating uplink (UL) or downlink (DL) user data scheduling "HARQ RTT Timer": (timer for specifying) the minimum number of subframes until DL HARQ retransmission is performed "drx-RetransmissionTimer": (timer for specifying) the time duration used for retransmission Upon receiving new DL data while "On duration", the UE 100 activates the "drx-InactivityTimer". Simultaneously, the "HARQ RTT Timer" is activated. If the DL data was not correctly decoded, the "drx-RetransmissionTimer" is simultaneously activated upon expiration of the "HARQ RTT Timer". If successfully decoding the DL data after the retransmission of the DL data, the UE 100 stops the "drx-RetransmissionTimer". Then, the sleep duration is started at the same time the "drx-InactivityTimer" expires.

It is noted that a state in which the "On duration timer", the "drx-InactivityTimer", and the "drx-RetransmissionTimer" are in operation, is referred to as "Active state". In the "Active state", the UE 100 monitors the PDCCH. A DRX state that is not in the "Active state" is referred to as "Inactive state".

Next, a state transition from a short DRX state to a long DRX state will be described. Basically, the UE 100 starts from the short DRX and transitions to the long DRX state upon elapsing of a time duration set by a "drxShortCycleTimer".

At the time point when the DL data is correctly decoded, the UE 100 activates the "drxShortCycleTimer". If receiving new data during the operation of the "drxShortCycleTimer", the UE 100 restarts again the "drxShortCycleTimer" upon correctly decoding the data. Meanwhile, if new data is not received before the "drxShortCycleTimer" expires, state transition from the short DRX to the long DRX occurs. Then, if new data is received after transitioning to the long DRX, state transition from the long DRX to the short DRX occurs again.

The configuration information (the "On duration", various types of timers, the long DRX cycle, the short DRX cycle, and the like) including each parameter of the DRX described above, is configured in the UE 100 by "DRX-Config", which is an information element in an individual RRC message.

In the above-described embodiment, the UE 100 requested the desired extended DRX cycle in the idle mode; however, this is not limiting. The UE 100 may notify the eNB 200 or the MME 300 of a request related to the desired (extended) DRX in the connected mode.

For example, the UE 100 may request shortening of the "On duration" (monitoring subframe of PDCCH). Furthermore, the UE 100 may request shortening of the "(drx-) InactivityTimer". In addition, the UE 100 may request shortening of the "(drx-) RetransmissionTimer". Furthermore, the UE 100 may request a release of the configuration of the short DRX. In addition, the UE 100 may request elongation of the "shortDRX-Cycle". Moreover, the UE 100 may request shortening of the "Short DRX Cycle Timer" for measuring the duration during which the short DRX is executed. According to these requests, an effect of further reducing the power consumption can be obtained.

In the above-described embodiment, as one example of a cellular communication system, the LTE system is described; however, the present disclosure is not limited to the LTE system. The above-described operations may be executed in systems other than the LTE system.

The invention claimed is:

1. A communication method, comprising:
   notifying, by a base station, a user equipment of a discontinuous reception (DRX) cycle;
   notifying, by a Mobility Management Entity (MME), the user equipment of an extended DRX cycle longer than the DRX cycle;
   determining, by the user equipment, whether or not the base station supports an extend DRX;
   using, by the user equipment, the extended DRX cycle to execute an extended DRX operation in an idle mode, in response to determining that the base station supports the extend DRX;
   using, by the user equipment, the DRX cycle to execute a DRX operation in the idle mode without using the extended DRX cycle, in response to determining that the base station does not support the extend DRX;
   establishing an RRC connection with the base station and entering an RRC connected mode, by the user equipment;
   receiving, by the user equipment, a connected mode DRX cycle length configured by the base station; and
   transmitting, by the user equipment, a message including information indicating a connected mode DRX cycle length desired by the user equipment, to the base station.

2. The communication method according to claim 1, wherein the determining whether or not the base station supports the extend DRX is based on a system information block (SIB) transmitted by the base station.

3. The communication method according to claim 1, wherein the using the DRX cycle comprises using the DRX cycle notified by the base station to execute the DRX operation in the idle mode without using the extended DRX cycle notified by the MME, in response to determining that the base station does not support the extend DRX.

4. A user equipment, comprising:

a controller including a processor and a memory communicatively coupled to the processor, wherein the controller is configured to:
  receive a discontinuous reception (DRX) cycle from a base station;
  receive an extended DRX cycle longer than the DRX cycle from a Mobility Management Entity (MME);
  determine whether or not the base station supports an extend DRX;
  use the extended DRX cycle to execute an extended DRX operation in an idle mode, in response to determining that the base station supports the extend DRX;
  use the DRX cycle to execute a DRX operation in the idle mode without using the extended DRX cycle, in response to determining that the base station does not support the extend DRX;
  establish an RRC connection with the base station and enter an RRC connected mode;
  receive a connected mode DRX cycle length configured by the base station; and
  transmit a message including information indicating a connected mode DRX cycle length desired by the user equipment, to the base station.

5. A processor and memory including instructions for controlling a user equipment, the processor communicatively coupled to the memory, such that when the instructions are executed by the processor, the processor executes processes of:
  receiving a discontinuous reception (DRX) cycle from a base station;
  receiving an extended DRX cycle longer than the DRX cycle from a Mobility Management Entity (MME);
  determining whether or not the base station supports an extend DRX;
  using the extended DRX cycle to execute an extended DRX operation in an idle mode, in response to determining that the base station supports the extend DRX;
  using the DRX cycle to execute a DRX operation in the idle mode without using the extended DRX cycle, in response to determining that the base station does not support the extend DRX;
  establishing an RRC connection with the base station and entering an RRC connected mode;
  receiving a connected mode DRX cycle length configured by the base station; and
  transmitting a message including information indicating a connected mode DRX cycle length desired by the user equipment, to the base station.

* * * * *